United States Patent
Augier et al.

(10) Patent No.: US 8,206,657 B2
(45) Date of Patent: Jun. 26, 2012

(54) ENCLOSURE CONTAINING A GRANULAR BED AND A DISTRIBUTION OF A GAS PHASE AND OF A LIQUID PHASE CIRCULATING IN AN ASCENDING FLOW IN THIS ENCLOSURE

(75) Inventors: Frédéric Augier, Saint Symphorien D'Ozon (FR); Robert Beaumont, Rillieux la Pape (FR); Christophe Boyer, Charly (FR); Denis Darmancier, Vienne (FR)

(73) Assignee: IFP, Cedex (FR)

( * ) Notice: Subject to any disclaimer, the term of this patent is extended or adjusted under 35 U.S.C. 154(b) by 870 days.

(21) Appl. No.: 12/134,232

(22) Filed: Jun. 6, 2008

(65) Prior Publication Data

US 2008/0308460 A1 Dec. 18, 2008

(30) Foreign Application Priority Data

Jun. 12, 2007 (FR) ...................................... 07 04225

(51) Int. Cl.
*B01J 8/02* (2006.01)
*B01D 19/00* (2006.01)

(52) U.S. Cl. ............ 422/220; 261/96; 261/97; 208/108; 208/143; 208/264

(58) Field of Classification Search .................. 422/216, 422/220, 311; 261/96, 97; 208/108, 143, 208/264

See application file for complete search history.

(56) References Cited

U.S. PATENT DOCUMENTS

| | | | |
|---|---|---|---|
| 4,639,354 A * | 1/1987 | Bischoff et al. | ............. 422/140 |
| 5,076,908 A | 12/1991 | Stangeland et al. | |
| 5,603,904 A | 2/1997 | Bachtel et al. | |
| 5,648,051 A | 7/1997 | Trimble et al. | |
| 5,885,534 A | 3/1999 | Reynolds et al. | |
| 6,517,706 B1 * | 2/2003 | Pruden et al. | ............. 208/108 |
| 2002/0011428 A1 * | 1/2002 | Scheuerman | ............. 208/89 |
| 2004/0004030 A1 | 1/2004 | Gibson et al. | |

OTHER PUBLICATIONS

French Search Report, FR 0704225, Dec. 6, 2007.

* cited by examiner

*Primary Examiner* — Walter D Griffin
*Assistant Examiner* — Renee E Robinson
(74) *Attorney, Agent, or Firm* — Antonelli, Terry, Stout & Kraus, LLP.

(57) ABSTRACT

An enclosure includes at least one packed bed and a mixture supply line for delivering at the bottom of the enclosure a mixture of a liquid with a gas. The enclosure includes a system for separating the liquid phase and the gas phase of the mixture, the system being arranged between the bed and the mixture supply line, and this system including a housing having a flow passage for the degassed liquid and discharge passages for the disengaged gas.

11 Claims, 5 Drawing Sheets

Figure 1:
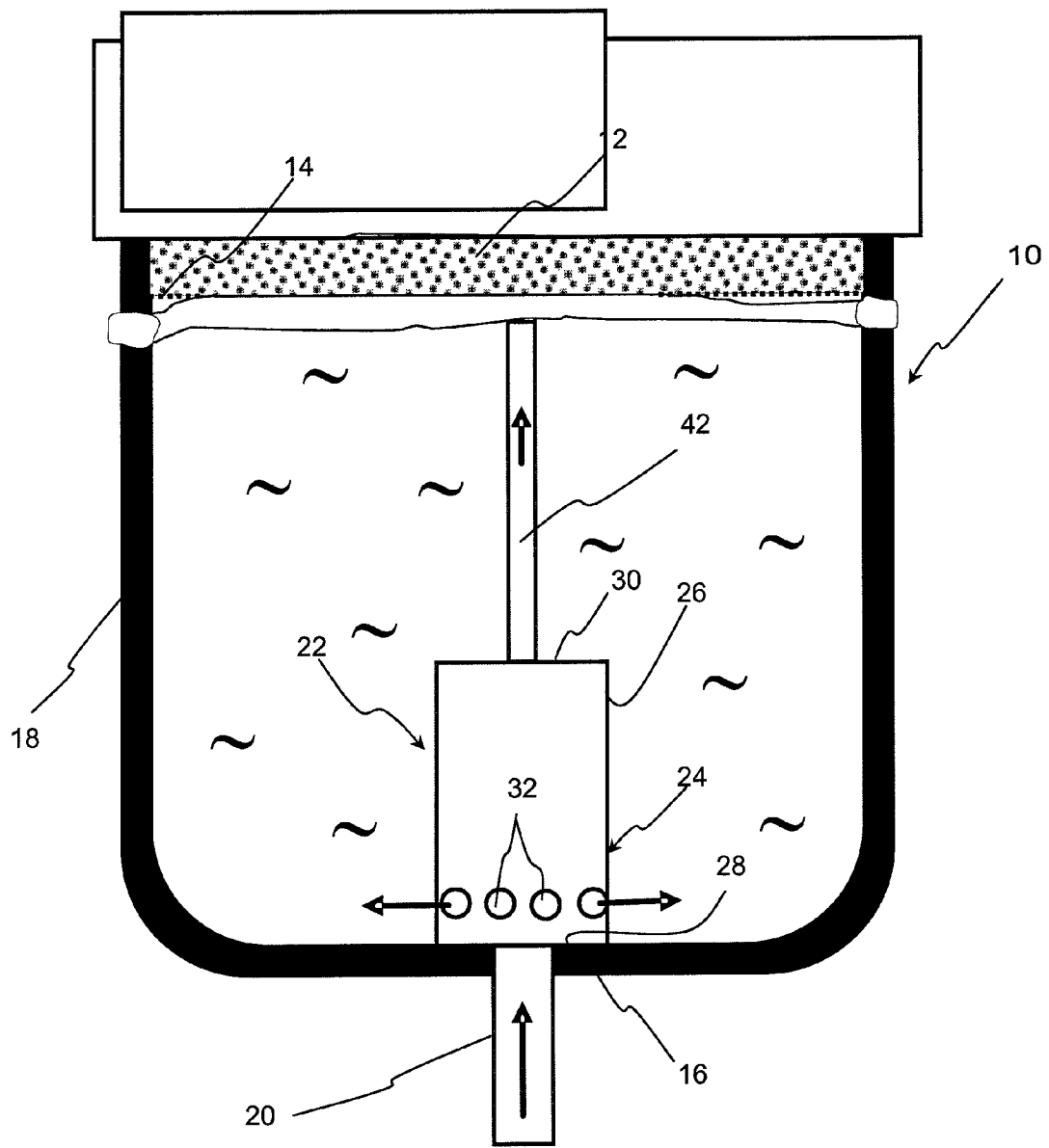

ENCLOSURE CONTAINING A GRANULAR BED AND A DISTRIBUTION OF A GAS PHASE AND OF A LIQUID PHASE CIRCULATING IN AN ASCENDING FLOW IN THIS ENCLOSURE

FIELD OF THE INVENTION

The present invention relates to an enclosure (or reactor) containing a granular bed and with a distribution of a gas phase and of a liquid phase circulating in an ascending flow in this enclosure.

It relates to an enclosure intended for treatment or hydrotreatment of a fluid feedstock and for catalytic treatment of distillates from heavy crudes.

It more particularly relates to a system generally arranged within the enclosure and allowing separation of the liquid and gas phases, as well as distribution of this gas and of this liquid in the lower part of this enclosure in order to achieve an ascending co-current gas and liquid flow.

BACKGROUND OF THE INVENTION

It is widely known that, in the enclosure type with a fixed catalyst bed, it is necessary to distribute as homogeneously as possible the gas phase as well as the liquid phase.

It is also necessary to provide the most even and uniform distribution possible of these two phases all along the frontal section of the enclosure so as to optimize gas-liquid contact in the enclosure and to operate the various zones of this enclosure in a substantially identical manner.

As it is known in the art, this distribution can be achieved by various means, notably using a perforated distribution plate equipped with vertical chimneys. This allows the gas to be distributed through the perforations of the plate and the liquid through the chimneys, as described in detail in patent DE-1,933,857.

There is also a known enclosure comprising a gas and liquid supply where the gas and the liquid are introduced together through a line arranged at the bottom of the enclosure. This enclosure also comprises a chimney distributor arranged all along the cross-section thereof and allowing the gas and the liquid to be distributed.

This type of enclosure, although technically interesting because of the use of a single supply line, however involves quite considerable drawbacks.

In fact, the gas and the liquid are fed into the enclosure in form of a mixture and this introduction generates disturbances in the gas-liquid interface present below the chimney distributor.

Besides, operation is not optimized because the gas is poorly dispersed over the cross-section of the enclosure, and a gas column generally rises at the centre thereof. This disturbs the gas-liquid interface below the distribution plate and leads to a poor gas distribution below the plate.

Furthermore, gas can possibly enter the chimneys and, in case of a gas column, there will be a bad gas distribution with the presence of a larger proportion of this gas in the central zone of the plate.

The present invention aims to overcome the aforementioned drawbacks by means of an enclosure with a catalyst bed comprising a liquid and gas phase separation system allowing to obtain a gas phase evenly distributed all along the section of the enclosure that does not disturb the gas-liquid interface.

SUMMARY OF THE INVENTION

The present invention therefore relates to an enclosure comprising at least one packed bed and means for delivering at the bottom of the enclosure a mixture of a liquid and of a gas, characterized in that the enclosure comprises a system for separating the liquid phase and the gas phase of said mixture, in that the system is arranged between the bed and said mixture supply means and in that said system comprises a housing including flow means for the degassed liquid and discharge means for the disengaged gas.

The housing can comprise holes on the peripheral wall thereof for the degassed liquid to flow through.

The housing can comprise means for increasing the gas and liquid separation.

The increasing means can comprise a plate arranged opposite the mixture delivery means.

The housing can comprise a supply line arranged inside said housing and connected to the mixture delivery means.

The housing can comprise a gas discharge line comprising pressure drop creation means.

The pressure drop creation means can comprise at least one lateral opening on the line.

One end of the discharge line can be arranged inside the housing and the at least one lateral opening can be arranged on said other end.

The pressure drop creation means can comprise a decrease in the section of the discharge line.

The housing can comprise a disengaged gas dispatcher allowing this gas to be distributed all along the section of the enclosure.

The dispatcher can comprise at least one radial arm provided with gas diffusion nozzles.

The enclosure can comprise a substantially horizontal plate occupying the entire section of the enclosure, hollow tubes running through said plate and perforations provided on this plate so as to communicate the two sides of said plate.

The invention also relates to a method intended for hydrotreatment of a fluid feedstock or for catalytic treatment of distillates using the enclosure according to the invention.

BRIEF DESCRIPTION OF THE INVENTION

Figure 2:
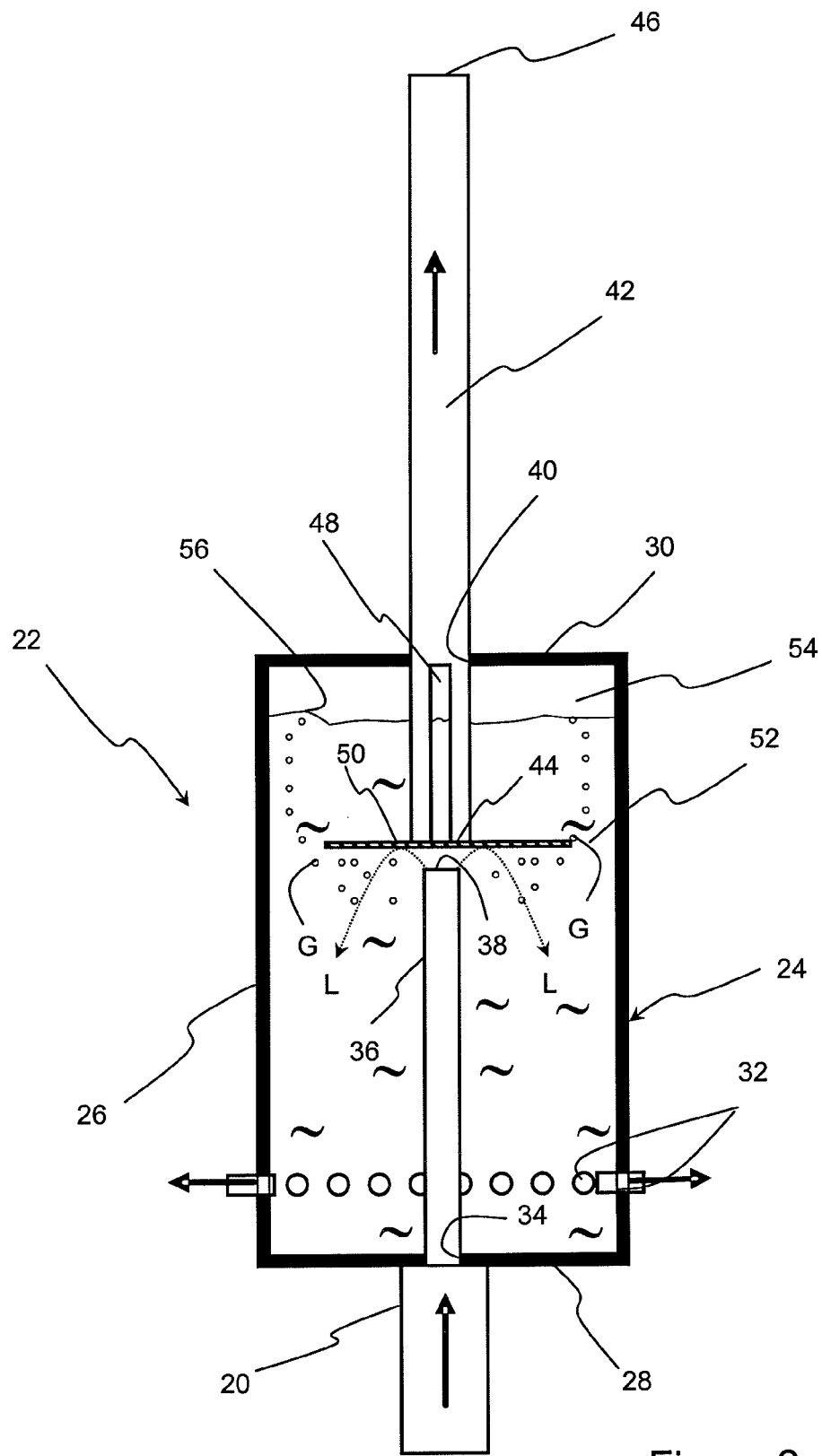
Figure 3:
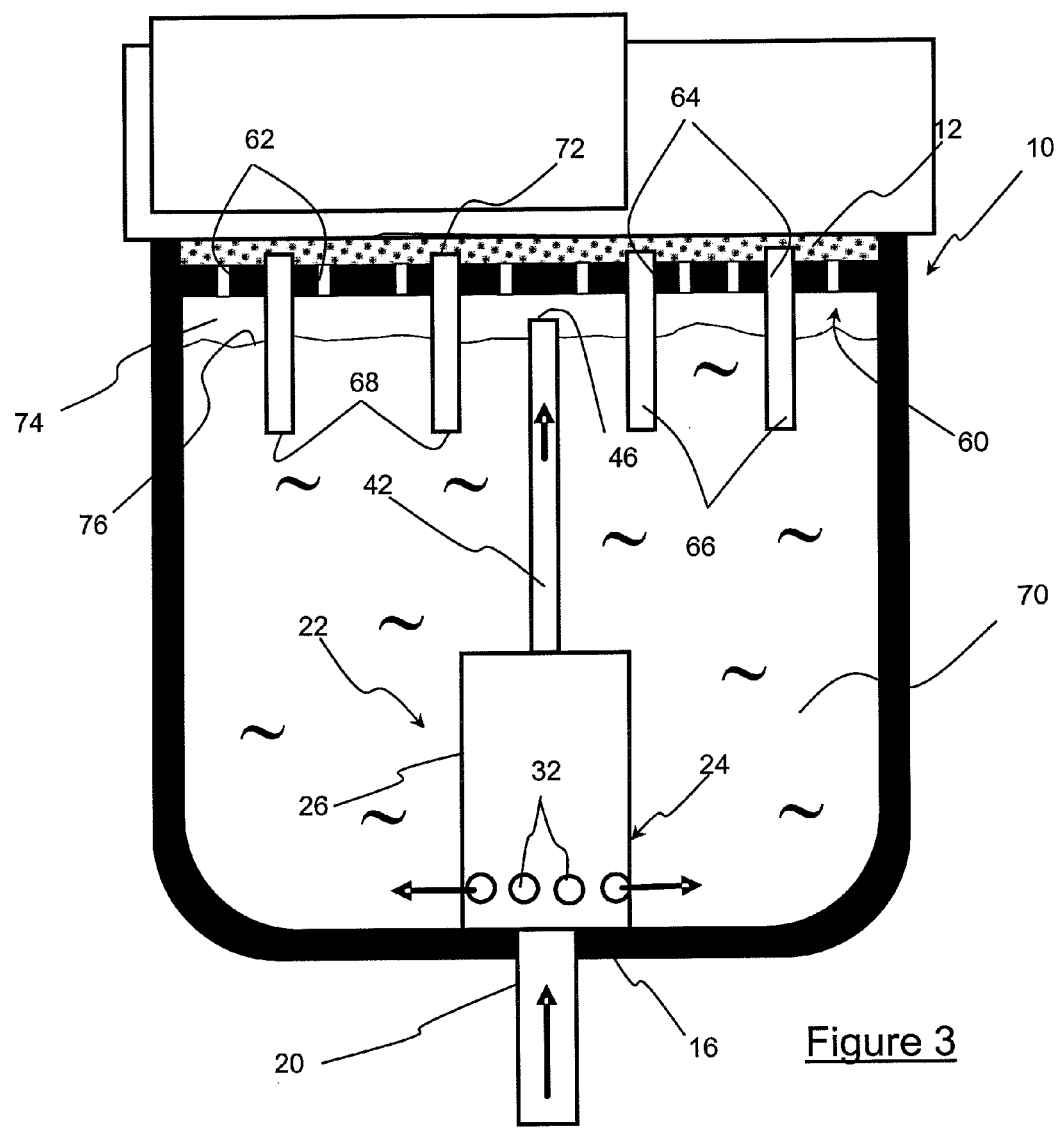
Figure 4:
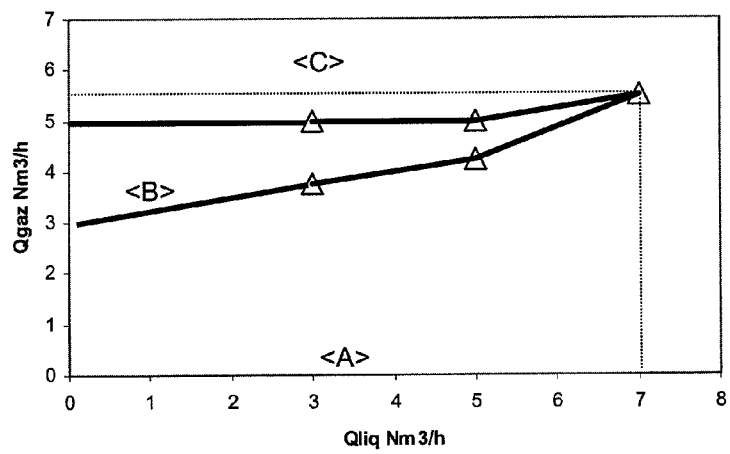
Figure 5:
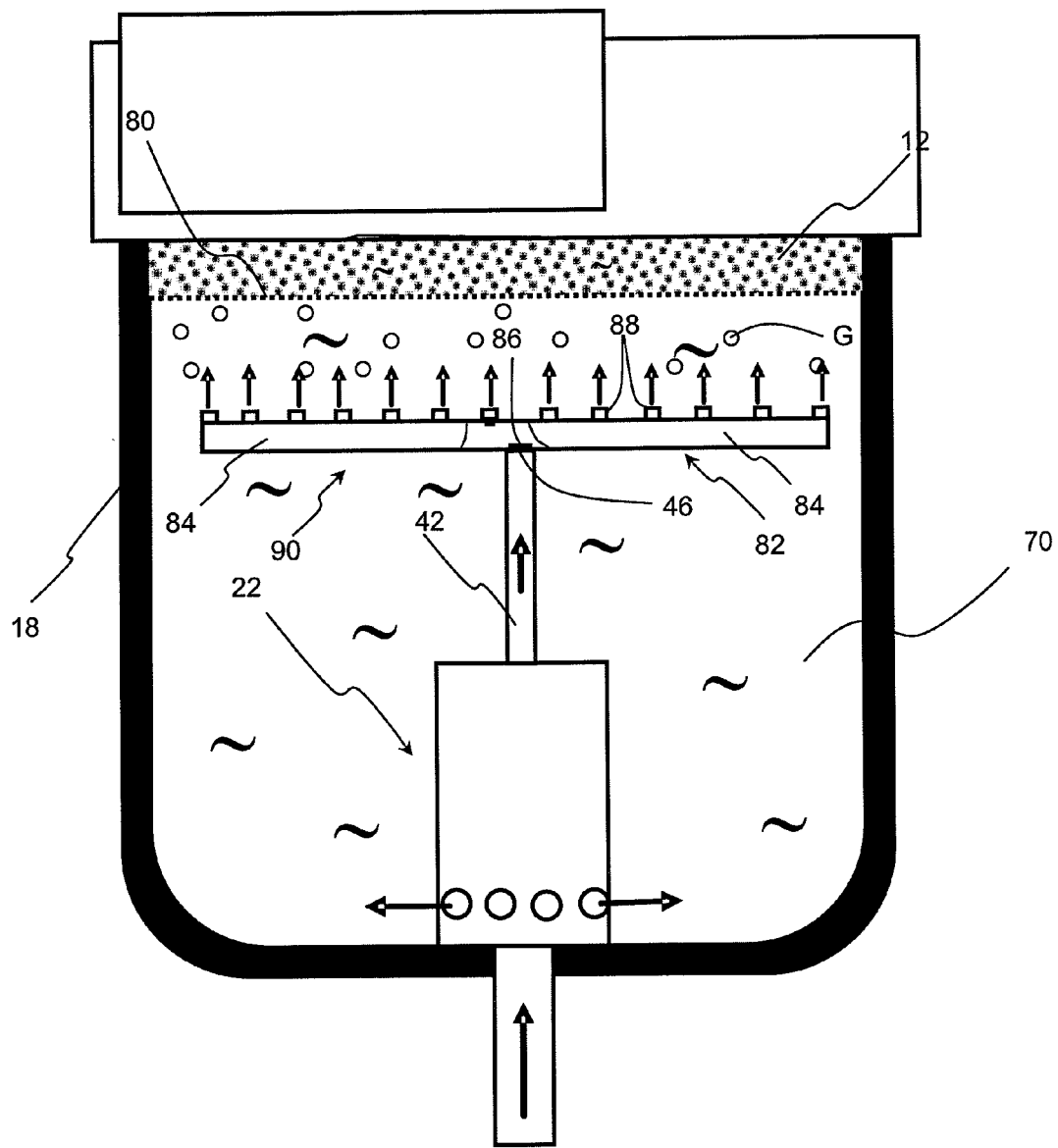
Figure 6:
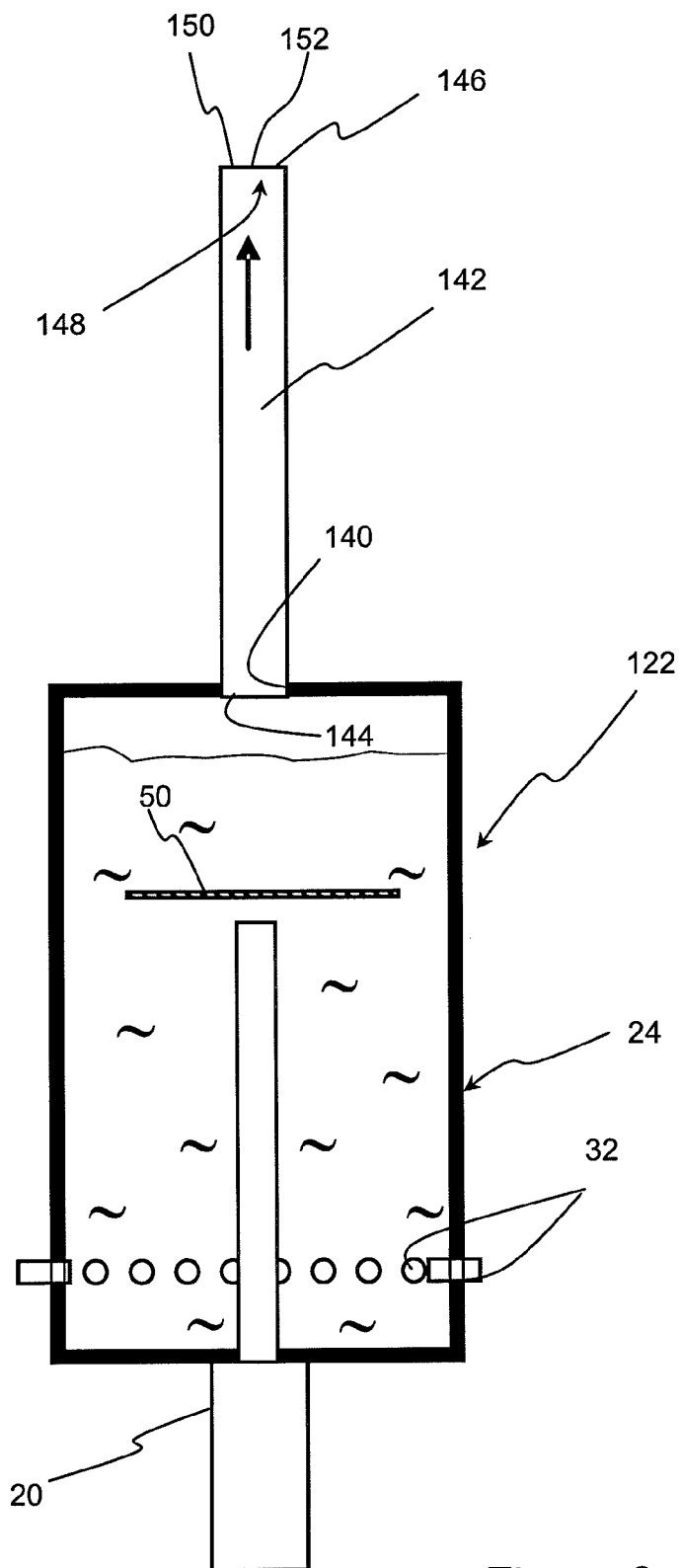

Other features and advantages of the invention will be clear from reading the description hereafter, given by way of non limitative example, with reference to the accompanying figures wherein:

FIG. 1 is a partial axial sectional view of an enclosure comprising the phase separation system according to the invention, FIG. 2 is a larger-scale detail view in axial section of the phase separation system of FIG. 1, FIG. 3 is another partial axial sectional view of a variant of an enclosure comprising the phase separation system according to the invention, FIG. 4 is a diagram illustrating the operating conditions of the separator with the gas flow rate Qgaz and the liquid flow rate Qliq according to an example corresponding to the enclosure of FIG. 3, FIG. 5 is a partial axial sectional view of another enclosure comprising another variant of the phase separation system according to the invention, and FIG. 6 is a detail view in axial section of the phase separation system according to a variant of FIG. 2.

DETAILED DESCRIPTION

FIG. 1 shows a closed enclosure 10, generally of vertical elongate tubular shape, that comprises in the upper part thereof means for supplying products (not shown) allowing to form at least one granular bed 12. What is referred to as granular bed is a set of solid particles having the shape of grains whose dimensions are of the order of some millimeters and having advantageously a catalytic activity allowing to form a catalyst bed.

This bed is delimited in the lower part of this enclosure by a transverse perforated support 14 that is arranged at a distance from bottom 16 of the enclosure and that extends to the peripheral wall 18 of the enclosure. The open-worked spaces of the perforated support are such that they do not allow passage of the particles, but they do allow passage of all gases and liquids.

It is of course clear that the term enclosure used above relates to the columns as well as the reactors.

Similarly, the term catalyst relates to the fresh catalyst as well as the regenerated catalyst.

The enclosure comprises in the bottom thereof, preferably in the median zone thereof, a line 20 delivering a mixture of a gas phase and of a liquid phase (or feedstock). Advantageously, the gas phase comprises at least partly hydrogen, whereas the liquid phase essentially comprises hydrocarbons. The mixture can possibly comprise other phases such as water with air or oxygen, a hydrocarbon or hydrocarbons with air or oxygen.

A system 22 allowing to separate and to distribute the phases contained in the mixture fed into the enclosure is thus arranged on this bottom, this system being referred to as decanter in the description hereafter.

As illustrated in FIG. 2, decanter 22 comprises a tubular housing 24 of generally elongate shape in the direction of the enclosure, whose cross-section is preferably smaller than the cross-section of this enclosure and whose height is less than the height between bottom 16 of the enclosure and support 14.

This housing comprises a substantially circular peripheral wall 26 delimited by a lower end wall 28 resting against bottom 16 of the enclosure and an upper end wall 30 at a distance from support 14.

The peripheral wall is fitted, in the vicinity of lower wall 28, with holes 32 allowing to provide communication between the inside of the housing and the bottom of the enclosure. These holes are advantageously evenly distributed circumferentially all along the peripheral wall of the housing. Besides the circular holes shown in the figure, there can be holes of any shape and layout, such as oblong, square, rectangular holes, etc., arranged symmetrically or not in relation to the general axis of the housing.

Lower wall 28 of the housing carries a bore 34, preferably circular and coaxial to the general axis of the housing, allowing sealed communication with supply line 20 of the enclosure and wherein a substantially vertical supply pipe 36 whose end 38 is arranged at a distance from upper wall 30 is tightly connected.

Possibly, contrary to what is illustrated in FIG. 2, the sections of line 20, of bore 34 and of pipe 36 can be identical so as to limit pressure drops.

Upper wall 30 of the housing comprises an orifice 40 of circular shape, advantageously coaxial to that of bore 34. This orifice provides sealed communication with a discharge pipe 42 whose inlet 44 is located inside the housing while being at a distance from end 38 of supply pipe 36 and whose outlet 46 is at a distance from support 14. The part of the discharge pipe arranged inside the housing comprises, on the peripheral wall thereof, at least one lateral opening 48, here in form of a vertical slot extending from inlet 44 and ending before upper wall 30, whose dimensions and layout allow to create a pressure drop for the gas, as described in the description hereafter.

Advantageously, as illustrated in FIG. 2, the housing comprises means for increasing the separation of the gas and of the liquid. These means include a horizontal plate 50, referred to as splitter plate, which rests on inlet 44 of discharge pipe 42 while preferably closing this inlet. The surface area of this plate, preferably of circular shape, is such that the section of the plate can range from the section of end 38 of pipe 36 to the total section of the enclosure. This plate can be perforated or have the shape of a grate, or it can be solid, as illustrated in the figure. In the latter configuration, the peripheral edge of this plate is at a distance from the inside of the peripheral wall of the housing so as to allow a circular circulation passage 52.

During operation, the mixture of gas and liquid fed through supply line 20 enters intake pipe 36 and flows out through end 38 of this pipe while contacting splitter plate 50. After this introduction, the liquid of the mixture moves through gravity in the direction of lower wall 28 with a sufficiently low descent velocity to allow the gas bubbles G disengaged from the liquid to flow upwards in the direction of upper wall 30 through passage 52. Preferably, the descent velocity of the liquid ranges between 0.4 and 0.05 m/s to allow total decantation of the liquid before it leaves the housing. It can be noted that, under the effect of the impact of the mixture on the splitter plate, the gas bubbles separate from the mixture even more rapidly and in a larger proportion. A separation of the phases of this mixture thus occurs, with a liquid phase (arrow L) predominantly containing liquid and a gas phase predominantly containing gas disengaged from the liquid.

The degassed liquid phase, i.e. freed of a large part of the gas, leaves housing 24 through holes 32 and enters the bottom of the enclosure.

Gas bubbles G gather at the level of the upper part of the housing and form a gas cushion 54 below upper wall 30 while delimiting a gas-liquid interface 56. This gas cushion can be achieved notably through the presence of slots 48 in discharge pipe 42 whose dimensions and number are determined by the person skilled in the art in order to create a pressure drop with the gas. Furthermore, these slots must allow to create a sufficiently thick cushion layer to prevent the degassed liquid from being sucked into pipe 42 while passing through these slots 48.

Thus, after decantation of the mixture fed into the housing, there remains a gas-free liquid, preferably located below splitter plate 50, which is discharged to the bottom of the enclosure through holes 32, and a gas phase forming a gas cushion 54, preferably located above plate 50, which is discharged through slots 48 and circulates in discharge pipe 42 towards outlet 46 thereof.

This disengaged gas produced by this decanter can then be used either with an enclosure comprising a gas and liquid distribution plate (FIG. 3), or with an enclosure comprising only a support grate for the catalyst bed (FIG. 5).

In FIG. 3, enclosure 10 comprises a substantially horizontal chimney plate 60, instead of perforated support 14, serving as a support for catalyst bed 12 and arranged at a distance from bottom 16 of the enclosure while extending over the entire section of this enclosure.

This plate comprises a multiplicity of perforations one part 62 of which is used for distributing the gas coming from discharge pipe 42 onto bed 12, the other part 64 of these perforations receiving vertical hollow tubes 66 referred to as chimneys in the description below. These chimneys comprise open lower ends 68 dipping in the degassed liquid 70 contained in the bottom of the enclosure and coming from housing 24, as well as upper ends 72 communicating with bed 12.

Advantageously, the distance between outlet 46 of discharge pipe 42 and the lower face of the plate is of the order of 1 to 100 mm, preferably 10 to 50 mm, and this distance is shorter than the distance between this lower face and the lower end of chimneys 66.

Thus, the gas leaving discharge pipe 42 is sent below plate 60 where a gas overhead 74 forms and delimits an interface 76 between the gas and the degassed liquid 70. This gas overhead is obtained as a result of the pressure drop achieved by perforations 62 of the plate whose number, distribution and dimensions are determined by the person skilled in the art in such a way that interface 76 is located below gas outlet 46.

This outlet 46 is therefore always arranged in gas overhead 74 and the gas directly flows into this overhead without disturbing interface 76.

While the enclosure is operating, the gas of overhead 74 flows through perforations 62 whereas the degassed liquid circulates in chimneys 66. This gas and this liquid, homogeneously distributed all along plate 60, then flow through the reactive catalyst bed in an ascending motion to achieve the desired reaction, then they leave the enclosure through any means known to the person skilled in the art.

By way of example, the applicant has used an installation with an enclosure such as the enclosure illustrated in FIG. 3 with a water-air system at 25° C. and 1 bar abs. (0.1 MPa).

The enclosure used is 500 mm in diameter and distribution plate 60 consists of 7 chimneys 35 mm in diameter and 400 mm in height, with 14 perforations 62 0.9 mm in diameter.

Decanter 22 consists of a cylindrical housing 24 that is 170 mm in diameter and 300 mm in height. The splitter plate is solid and its diameter is 100 mm. It is located 100 mm below the top of the housing (the upper gas coalescence zone can be 100 mm in height).

Gas-liquid mixture supply line 20 is 40 mm in diameter. The diameter of discharge pipe 42 is 20 mm to 36 mm, 20 mm here, and it comprises a rectangular slot 48 of 1 mm to 5 mm, 1 mm here. The 20 holes 32 of the housing are arranged 10 mm away from lower wall 28 and their diameter is 10 mm.

The results of the use of such an enclosure can be seen in the graph of FIG. 4, with the liquid phase flow rate as the abscissa and the gas phase flow rate as the ordinate, which allows to define three operating zones <A>, <B> and <C>.

Thus, a first zone <A> for liquid flow rates from the neighbourhood of 0 to about 7 Nm3/h and for gas flow rates from about 3 Nm3/h to about 5.5 Nm3/h allows to observe that liquid passes through discharge pipe 42 and leaves through outlet 46.

In second zone <B> where the liquid flow rates range from the neighbourhood of 0 to about 7 Nm3/h and the gas flow rates range between about 3 Nm3/h and about 5 Nm3/h to about 5.5 Nm3/h, the enclosure allows to achieve, by means of the decanter, a nearly perfect separation between the liquid phase and the gas phase, with discharge of the gas phase only through pipe 42 and discharge of the liquid phase only through holes 32.

For the third zone <C>, the liquid flow rates range from the neighbourhood of 0 to about 7 Nm3/h and the gas flow rates range from about 5 Nm3/h to about 5.5 Nm3/h. In this zone, gas passes through holes 32. This disturbs the operation of the enclosure by creating a sort of bubbling at interface 76.

Consequently, the operation of this enclosure is preferred to obtain liquid and gas flow rates corresponding to zone <A>, preferably to zone <B>.

In case of use of the decanter with an enclosure comprising only a grate 80 as a support for the catalyst bed instead of perforated support 14, as illustrated in FIG. 5, decanter 22 is then also provided with a disengaged gas dispatcher 82 (or sparger). This dispatcher allows to distribute, all along the section of the enclosure, and in a nearly homogeneous manner, the disengaged gas from outlet 46 of gas discharge pipe 42.

This dispatcher comprises at least one hollow radial transverse arm 84, substantially horizontal, extending from pipe 42 in the direction of wall 18 of the enclosure. Advantageously, a multiplicity of arms evenly arranged angularly from the pipe is provided, for example six arms offset by 60° in relation to one another. This arm comprises a connecting bore 86 allowing to connect, by any known means, such as brazing or welding, the inside of this arm to outlet 46 of pipe 42. This arm also comprises a multiplicity of nozzles 88 distributed along each arm and in an axial direction in relation to bed 12. Preferably, the free end of the arm opposite connection 86 is closed by any means such as a plug. As illustrated in FIG. 5, at least one tube 90 forming two arms 84, one forming the continuation of the other, is used and connecting bore 86 is provided in the median zone of the tube.

Operation of this enclosure is identical to that of the enclosure of FIG. 3, with the exclusion of the presence of a gas overhead below the grate.

Thus, the disengaged gas circulating in pipe 42 of the decanter enters tube 90, circulates in each arm 84 and leaves through nozzles 88, flows through grate 80 and passes in an ascending motion onto bed 12. The degassed liquid 70 contained in the bottom of the enclosure also flows through the grate and similarly onto bed 12. As mentioned above, the gas and the liquid are collected in the upper part of the enclosure by any known means in order to be treated and/or stored.

Of course, without departing from the scope of the invention, decanter 22 with its dispatcher 82 of FIG. 5 can be used instead of the decanter of FIG. 3, with the advantage of achieving a gas overhead in a more rapid and homogeneous manner.

The variant of decanter 122 of FIG. 6 differs from that of FIG. 2 in that orifice 140 allows sealed communication with a gas discharge pipe 142 whose inlet 144 is connected to this orifice without entering the housing and in that outlet 146 of this discharge pipe carries gas circulation restriction means 148. These means consist of a decrease in the section of outlet 146 that can be obtained by any means, such as a washer 150 connected to this outlet and comprising a small-diameter central bore 152, a grate, a plate comprising a multiplicity of bores, etc.

Thus, this section decrease allows to achieve a pressure drop with the gas disengaged from the liquid by thus creating gas cushion 54 below upper wall 30.

This decanter variant can also be used with the enclosure of FIGS. 1, 3 or with the enclosure of FIG. 5 with the addition, in the latter case, of dispatcher 82.

The invention finds applications, more particularly but not exclusively, in a fluid feed hydrotreating method or in a distillate catalytic treatment using the enclosure according to the invention.

The present invention is not limited to the examples described above and it encompasses any variant and equivalent.

Notably, for reasons of enclosure manufacture simplification, housing 24 may comprise no lower wall 28 and closing of this housing can be obtained by assembling the lower part of wall 26 with bottom 16. This can be done by brazing or welding.

Similarly, it has been experimentally determined that the decanter with pipe 42 comprising slots 48 allows operation over a wide range of liquid and gas flow rates without gas being entrained in the liquid, whereas the decanter with pipe 142 comprising restriction means 148 provides better separation of the gas and of the liquid.

Thus, when using a chimney plate, the decanter is preferably used with the pipe comprising slots for pressure drop, because liquid entrainment in the gas has no impact, while preventing gas entrainment in the liquid.

The invention claimed is:

1. An enclosure, comprising:
   at least one packed bed;
   a mixture supply line for delivering at a bottom of the enclosure a mixture of a liquid phase with a gas phase; and
   a system for separating the liquid phase and the gas phase of the mixture arranged between the packed bed and the mixture supply line, the system comprising a housing connected to the mixture supply line, an element for increasing separation of the liquid phase and the gas phase in the housing and opposed to the mixture supply line, an outlet for degassed liquid provided at a lower portion of the housing, and a discharge path for disengaged gas provided at a top of the housing.

2. An enclosure as claimed in claim 1, wherein the outlet for the degassed liquid comprises holes on the peripheral wall of the housing for the degassed liquid to flow through.

3. An enclosure as claimed in claim 1, wherein the element for increasing separation of the liquid phase and the gas phase in the housing comprises a plate.

4. An enclosure as claimed in claim 1, wherein the housing further comprises a supply line arranged inside the housing and connected to the mixture supply line.

5. An enclosure as claimed in claim 1, wherein the discharge path for disengaged gas comprises a gas discharge pipe comprising pressure drop creation means.

6. An enclosure as claimed in claim 5, wherein the pressure drop creation means comprise at least one lateral opening on the discharge pipe.

7. An enclosure as claimed in claim 6, wherein one end of the discharge pipe is arranged inside the housing and in that the at least one lateral opening is arranged on the one end.

8. An enclosure as claimed in claim 5, wherein the pressure drop creation means comprise a decrease in a section of the discharge pipe.

9. An enclosure as claimed in claim 1, wherein the housing comprises a disengaged gas dispatcher allowing disengaged gas to be distributed all along a section of the enclosure.

10. An enclosure as claimed in claim 9, wherein the disengaged gas dispatcher comprises at least one radial arm provided with gas diffusion nozzles.

11. An enclosure as claimed in claim 1, further comprising a substantially horizontal plate occupying the entire section of the enclosure, hollow tubes running through the substantially horizontal plate and perforations provided on the substantially horizontal plate so as to communicate the two sides of the substantially horizontal plate.

* * * * *